United States Patent
Zhiwen

(10) Patent No.: US 10,972,810 B2
(45) Date of Patent: *Apr. 6, 2021

(54) METHOD FOR GENERATING A COMPOSITION OF AUDIBLE AND VISUAL MEDIA

(71) Applicant: Lomotif Private Limited, First Centre (SG)

(72) Inventor: Paul Yang Zhiwen, San Francisco, CA (US)

(73) Assignee: Lomotif Private Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,673

(22) Filed: Apr. 9, 2019

(65) Prior Publication Data
US 2019/0238953 A1 Aug. 1, 2019

Related U.S. Application Data

(63) Continuation of application No. 15/185,636, filed on Jun. 17, 2016, now Pat. No. 10,299,016.
(Continued)

(51) Int. Cl.
*H04N 21/8547* (2011.01)
*G11B 27/031* (2006.01)
*H04N 21/2743* (2011.01)
*H04N 21/84* (2011.01)
*H04N 21/262* (2011.01)
*H04N 21/482* (2011.01)
(Continued)

(52) U.S. Cl.
CPC ....... *H04N 21/8547* (2013.01); *G11B 27/031* (2013.01); *G11B 27/19* (2013.01); *G11B 27/322* (2013.01); *H04N 21/26258* (2013.01); *H04N 21/2743* (2013.01); *H04N 21/4825* (2013.01); *H04N 21/8106* (2013.01); *H04N 21/84* (2013.01)

(58) Field of Classification Search
CPC ......... H04N 21/8547; H04N 21/26258; H04N 21/2743; H04N 21/4825; H04N 21/8106; H04N 21/84; G11B 27/19; G11B 27/322; G11B 27/031
USPC ........................................... 386/285
See application file for complete search history.

(56) References Cited

U.S. PATENT DOCUMENTS

| | | | | |
|---|---|---|---|---|
| 2008/0215979 | A1* | 9/2008 | Clifton | G06F 16/40 715/716 |
| 2014/0226955 | A1* | 8/2014 | Man | G11B 27/031 386/285 |

* cited by examiner

*Primary Examiner* — Thai Q Tran
*Assistant Examiner* — Nienru Yang
(74) *Attorney, Agent, or Firm* — Run8 Patent Group, LLC; Peter Miller; Alexander R. Flake

(57) ABSTRACT

One variation of a method for distributing a composition of audio and visual media includes: at a first computing device, generating a first meta file for a first composition, including pointers to an audio track and pointers to, positions and durations of video masks for, and an order for a set of videos; storing the first meta file and a portion of a private video, in the set of videos, in a remote database; serving the audio track and the set of videos to a second computing device for playback at the second computing device according to the first meta file; in response to modification of the first composition at the second computing device, generating a second meta file for a second composition defining a modified arrangement of the first composition; and storing the second meta file for local playback of the second composition at a third computing device.

18 Claims, 8 Drawing Sheets

Related U.S. Application Data

(60) Provisional application No. 62/181,013, filed on Jun. 17, 2015.

(51) Int. Cl.
*H04N 21/81* (2011.01)
*G11B 27/19* (2006.01)
*G11B 27/32* (2006.01)

METHOD FOR GENERATING A COMPOSITION OF AUDIBLE AND VISUAL MEDIA

CROSS-REFERENCE TO RELATED APPLICATIONS

This Application is a continuation application of U.S. patent application Ser. No. 15/185,636, filed on Jun. 17, 2016, which claims the benefit of U.S. Provisional Application No. 62/181,013, filed on Jun. 17, 2015, which are incorporated in their entireties by this reference.

TECHNICAL FIELD

This invention relates generally to the field of audio and video compositions and more specifically to a new and useful method for generating a composition of audible and visual media.

BRIEF DESCRIPTION OF THE FIGS

DESCRIPTION OF THE EMBODIMENTS

The following description of the embodiments of the invention is not intended to limit the invention to these embodiments but rather to enable a person skilled in the art to make and use this invention.

1. Methods

As shown in FIGS. 1A-1L, a first method S100 for generating a composition of audible and visual media includes: at a computing device, receiving a selection for a first audio track, a selection for a set of videos, a first order for the set of videos, and a first duration of the composition in Block S110, wherein the set of videos includes a first video stored in memory on the computing device; setting a default position and a default duration of a video mask for each video in the set of videos based on the first audio track, the first order, and the first duration of the composition in Block S120, wherein a video mask defines a contiguous subset of frames in a corresponding video for insertion into the composition; in response to selection of at least one of an alternative audio track, an alternative order for the set of videos, and an alternative duration of the composition, setting an alternative position and an alternative duration of the video mask for each video in the set of videos in Block S130; generating a meta file including an address of a final audio track selected for the composition, an address of each video in a final set of videos selected for the composition, a final position and a final duration of a video mask corresponding to each video in the final set of videos, a final order for videos in the final set of videos, and a final duration selected for the composition in Block S140; and uploading the meta file and the first video to a remote database in Block S150.

Figure 3:
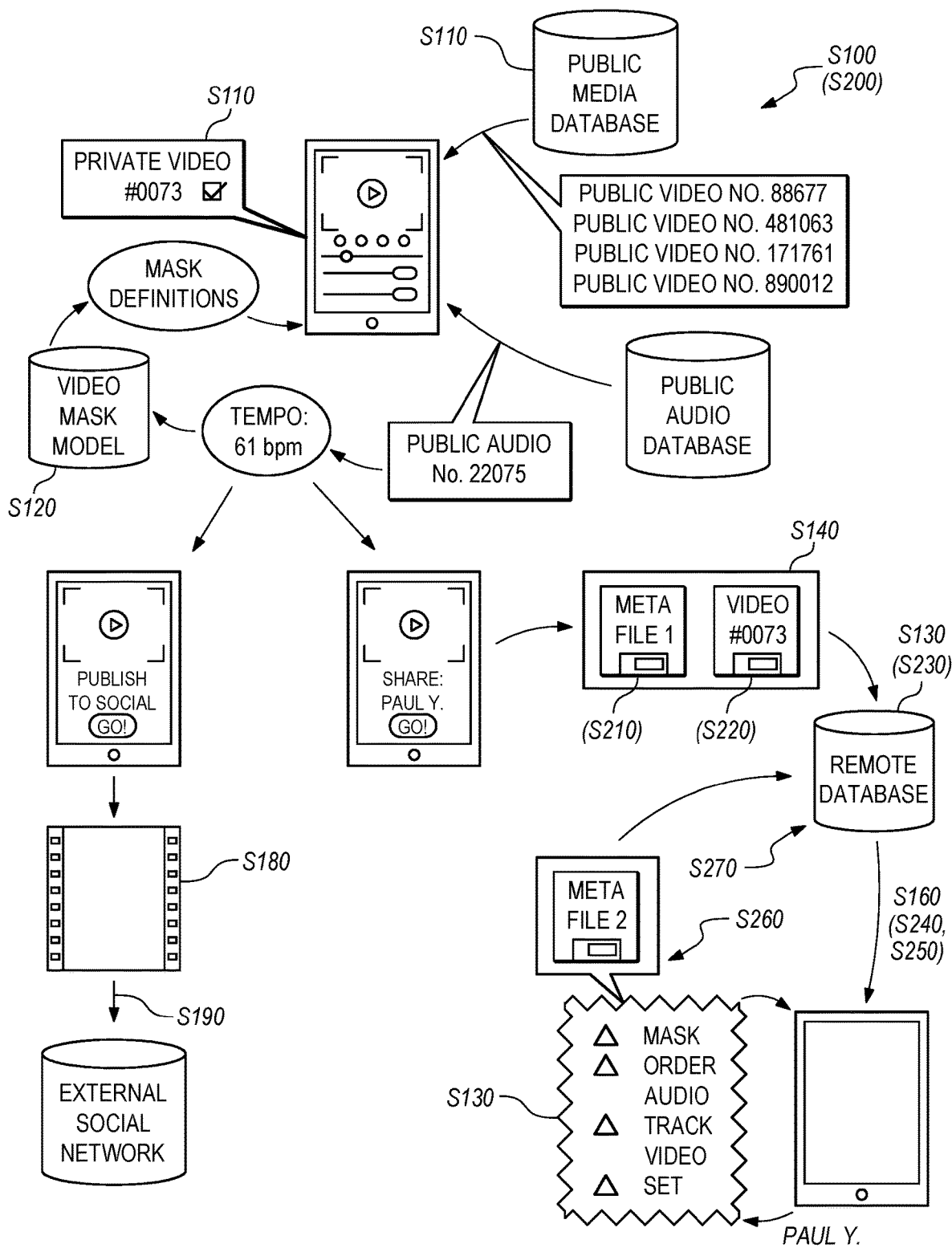
FIG. 3 is a flowchart representation of the first method and the second method.

As shown in FIG. 3, one variation of the first method S100 includes: at a first computing device, receiving a selection for a first audio track and an initial set of videos in Block S110, the initial set of videos including a private video stored locally on the first computing device; defining an initial order of videos in the initial set of videos in Block S110; for each video in the initial set of videos, defining an initial position and an initial duration of a video mask based on the first audio track, the initial order, and an initial duration of the composition, in Block S120 each video mask bounding a contiguous subset of frames in a corresponding video in the initial set of videos; in response to selection of at least one of an alternative audio track, an alternative order for the initial set of videos, and an alternative duration of the composition, modifying a video mask corresponding to a video in the initial set of videos in Block S130; generating a meta file including a pointer to a final audio track selected for the composition, a pointer to each video in a final set of videos selected for the composition, specification for a final position and a final duration of a video mask corresponding to each video in the final set of videos, and specification for a final order for videos in the final set of videos in Block S140; uploading the meta file and a portion of the private video from the first computing device to a remote database in Block S150; and loading videos in the final set of videos and the final audio track from the remote database onto a second computing device for replay at the second computing device according to the meta file in Block S160.

As shown in FIG. 3, the first method S100 for generating a composition of audio and visual media can also include: at a computing device, receiving a selection for an audio track and a set of videos in Block S110; characterizing a tempo of the audio track in Block S130; selecting a video mask model based on the tempo of the audio track in Block S130; defining an initial duration of a video mask, in a set of video masks, for each video in the set of videos based on the video mask model and a number of videos in the set of videos in Block S130, each video mask bounding a contiguous subset of frames in a corresponding video in the set of videos, and each the set of video masks of defining an aggregate duration equal to the selected duration of the composition; defining an initial position of a video mask for each video in the set of videos in Block S130; generating an audio mask bounding a duration of the audio track equal to the selected duration of the composition in Block S130; defining an initial order of videos in the initial set of videos in Block S120; redefining a position of a particular video mask corresponding to a particular video in the set of videos in response to manual selection of an alternative contiguous sequence of frames in the particular video through an editing portal executing on the computing device in Block S140; compiling the set of frames and the audio track into the composition based on the set of video masks, the audio mask, and a final order of videos in the set of videos in Block S150; and posting the composition to an external online social network in Block S190.

Figure 2:
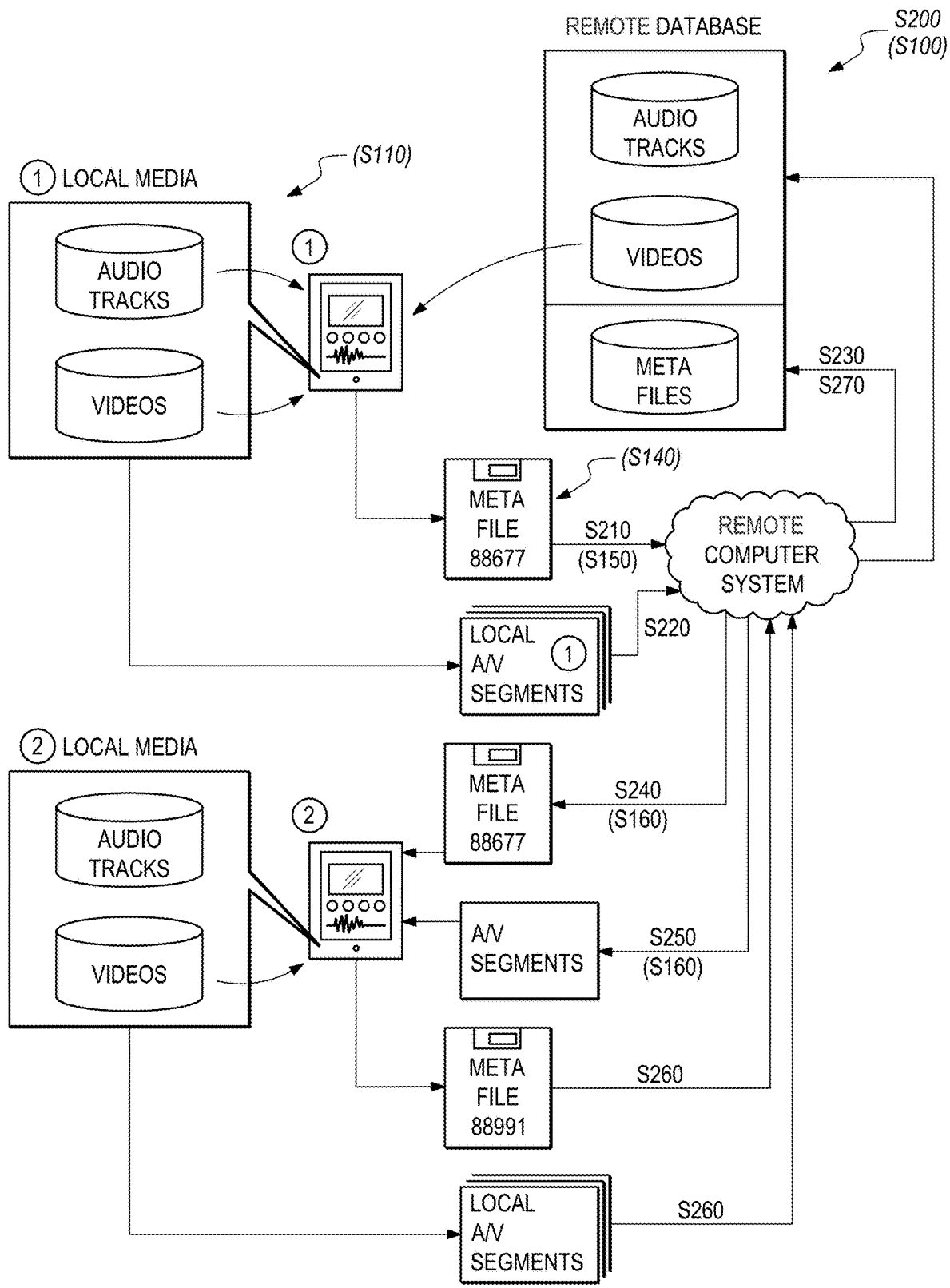
FIG. 2 is a flowchart representation of a second method.

As shown in FIG. 2, a second method S200 for distributing a composition of audio and visual media includes: from a first computing device, receiving a first meta file for a first composition in Block S210, the first meta file including an address of a first audio track selected for a first composition, an address of each video in a first set of videos selected for the first composition, a position and a duration of a video mask corresponding to each video in the first set of videos, and a first order for videos in the first set of videos; from the first computing device, receiving a first digital file of a first video, in the first set of videos, stored locally on the first computing device in Block S220; storing the first meta file and the first digital file in a remote database in Block S230; in response to receipt of a request for the first composition from a second computing device, serving the first meta file to the second computing device in Block S240; serving digital files of the first audio track and videos in the first set of videos to the second computing device for playback at the second computing device according to the first meta file in Block S250; in response to selection of at least one of an alternative audio track, an alternative order for the first set of videos, and an alternative video for the first composition at the second computing device, receiving a second meta file for a modified form of the first composition in Block S260; and storing the second meta file in the remote database in Block S270.

As shown in FIG. 3, one variation of the second method S200 includes: at a first computing device, generating a first meta file for a first composition, the first meta file including a pointer to a first audio track selected for a first composition, a pointer to each video in a first set of videos selected for the first composition, a position and a duration of a video mask corresponding to each video in the first set of videos, and a first order for videos in the first set of videos in Block S210; storing the first meta file and a portion of a private video, in the first set of videos, in a remote database in Block S230; serving the first meta file to a second computing device in Block S240; serving the first audio track and videos in the first set of videos to the second computing device for playback at the second computing device according to the first meta file in Block S250; at the second computing device, generating a second meta file for a second composition defining a modified arrangement of the first composition in response to selection of at least one of an alternative audio track, an alternative order for the first set of videos, and an alternative video for the first composition at the second computing device in Block S260; and storing the second meta file in the remote database for subsequent local playback of the second composition at a computing device in Block S270.

2. Applications

Generally, the first method S100 can be executed locally at a computing device—such as within a native composition application executing on a smartphone or tablet—to compile local (i.e., private) audio and visual media and/or remote (e.g., public) audio and visual media selected by a user into abbreviated compositions including both audible and visual elements from the selected audio and visual media. In particular, a native composition application executing the first method S100 on a mobile computing device can automatically set durations of video segments from each video in a set of selected videos based on a selected (or default) duration of the composition, an order of the video segments, and/or a quality (e.g., a tempo, beats per minute) of an audio track selected for the composition. The native composition application can set a duration of an audio segment from the selected audio track based on the selected (or default) duration of the composition, record edits to the start, center, or stop points for each video segment and the audio segment, record changes to the order of video segments in the composition, and repeat the foregoing methods and techniques in response to selection of additional or alternative video and in response to selection of an alternative audio track. According to the first method S100, the native composition application can store the start and stop points for each video segment and for the audio track, local or remote address of the audio and video media, video segment order, and/or visual overlays and filters, etc. in a meta file of relatively small file size and distinct from audio and video media selected for the composition. The native composition application can then upload the meta file and relevant portions of any local media designated for the composition to a remote computer system (e.g., a remote server, a remote database) for subsequent distribution to another user, as in the second method S200.

Blocks of the second method S200 can be executed by instances of the native composition application executing on various computing devices to generate and modify audio and visual ("A/V") compositions and by a remote computer system to share meta files, audio content, and visual content that form a composition between such computing devices. In particular, the remote computer system (or "remote server," "remote database") can store meta files, audio content, and visual content for a number of compositions generated by a group of users over time and can serve select meta files, audio content, and visual content to select computing devices to replace compositions over time; an instance of the native composition application executing on a computing device can retrieve audio and visual content for a selected composition from the remote computer system, order the visual content according to its corresponding meta file, and apply audio and video masks to the audio and visual content according to the meta file in order to replay the composition as defined by the composition's author. An instance of the native composition application executing on a computing device can implement methods and techniques like those described above to enable the user to replace or modify audio content, visual content, video order, video mask positions, etc. in the composition—thereby creating a second composition related to but different from the original composition—and the native composition application can generate a second meta file accordingly. According to the second method S200, the remote computer system can collect this second meta file and relevant portions of local audio and video media specified in the second composition and store these data in the remote database. The remote computer system can later share the second composition with another user, such as with the original author of the (first) composition via a corresponding computing device, with another user via a corresponding computing device, or by processing the second composition into a singular audio-video file in Block S180 and publishing this audio-video file to an external online social network in Block S190.

The third method can be executed locally at a mobile computing device or other computing device, such as by an instance of the native composition application, to: automatically compile audio (e.g., an audio track) and visual content (e.g., multiple videos) into an initial composition based on characteristics extracted from audio and visual files selected manually for the composition by a user; modify segments of the audio and visual content represented in the composition upon playback; process the disparate audio and visual content into a singular composition file once confirmed by the user; and to publish the singular composition file to an external online social network. In particular, a native composition application executing on a computing device can implement the third method S100 to automatically define positions and varying durations of video masks for videos selected for the composition, to automatically define a position and duration of an audio mask for an audio track selected for the composition, and to order the selected videos based on the tempo of the audio track, timestamps stored in video metadata, and/or location data stored in video metadata, etc. such that an initial version of the composition replayed by a user when creating requires limited editing by the user to reach a final version of the composition that the user may then share with others through one or more external online social networks.

3. Media Selection

Block S110 of the first method S100 recites, at a computing device, receiving a selection for a first audio track, a selection for a set of videos, a first order for the set of videos, and a first duration of the composition, wherein the set of videos includes a first video stored in memory on the computing device. (One variation of the first method S100 includes, at a first computing device, receiving a selection for a first audio track and an initial set of videos, wherein the initial set of videos includes a private video stored locally on the first computing device.) Generally, in Block S110, a native composition application (or other program or system) executing the first method S100 records selections of various audio and visual media, such as through a user interface, in preparation for compilation of these media into a composition. In particular, in Block S110, the native composition application records a user's selection of at least one audible resource ("audio track") and at least two visual resources (e.g., videos, static images). (The first and second methods S100, S200 are described herein as compiling video segments, which may include both videos and static images.)

Figure 1A:
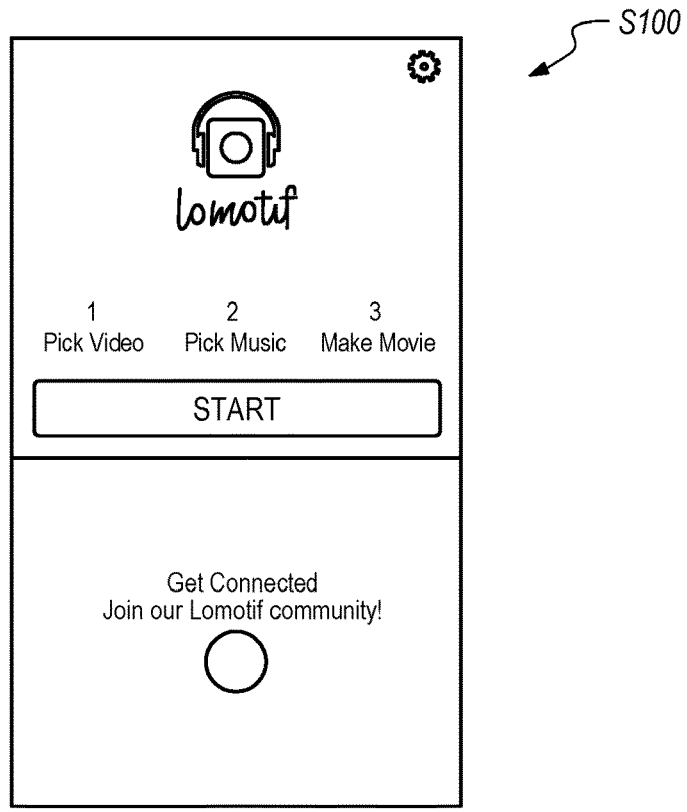
FIGS. 1A-1L are graphical representations of a first method.
Figure 1B:
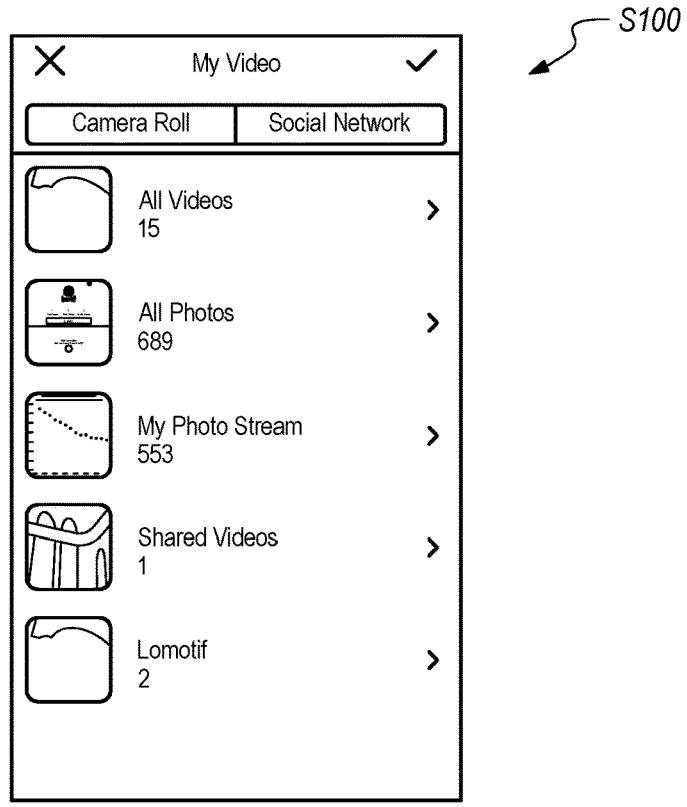
Figure 1C:
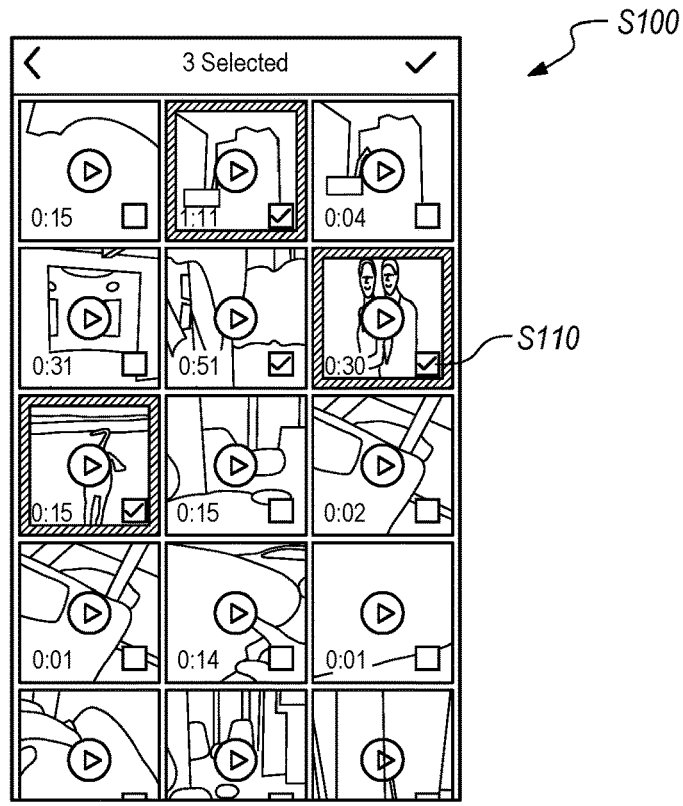

In one implementation, the native composition application accesses local audible and visual media for the composition, as shown in FIGS. 1B and 1C. In one example, the native composition application accesses audio files stored locally on the computing device—such as a purchased song stored in local memory or an audio recording made and stored locally on the computing device—and presents these audio files in visual format within the user interface for selection of a particular audio track by the user. In this example, once the user selects a particular audio track, the native composition application similarly accesses visual files stored locally on the computing device—such as videos and/or photographs recorded by the computer system and stored in local memory—and presents these visual files in visual format within the user interface (or "editing portal") for selection of all or a subset of these visual files by the user.

Figure 1D:
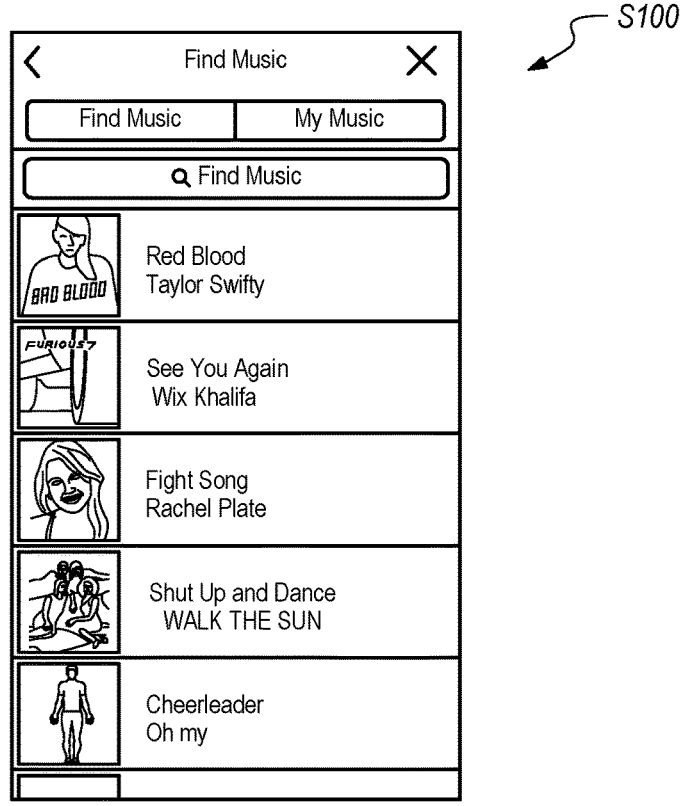
Figure 1E:
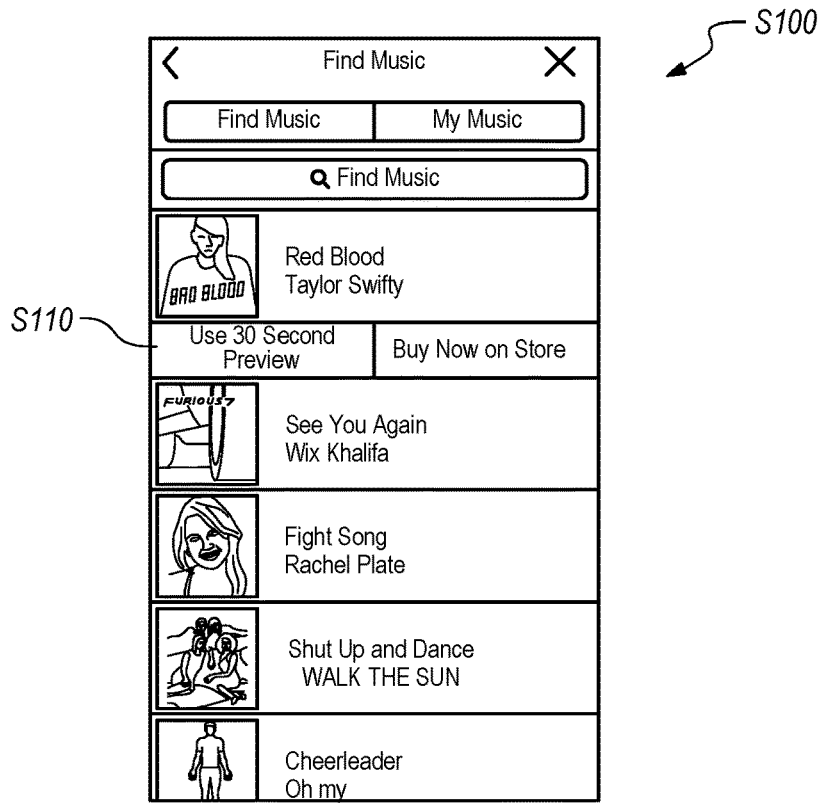

The native composition application can also access public audible and visual media, as shown in FIGS. 1D and 1E. For example, the native composition application can retrieve media from a public media database associated with the remote computer system, such as videos, photographs, and/or audio tracks uploaded by other users and stored in the public media database upon completion of compositions, as described herein. In this example, the public media database can serve only media authorized for public access within the native composition application, and the native composition application can also support purchase of such media from corresponding artists and other users. The native composition application can also access media from a third-party database, such as hosted by an external media distribution company. For example, the native composition application can access branded visual content (as described below) supplied by a marketing company, access original song titles supplied by recording studios and labels, and retain copies of media or licenses to such media purchased by the user through the user interface. For example, in Block S110, the native composition application executing on the computing device can receive both: a selection for a private video recorded at and stored on the first computing device and not currently permitted for viewing by persons other than those authorized by the user (e.g., by "sharing" the composition with another user); and a second video recorded at another computing device, stored in the remote database, and assigned a general permission enabling all users on a platform hosting the public media database to view the second video and to insert frames of the second video into their personal compositions.

However, in Block S100, the native composition application can access any combination of audible media and visual media stored locally on the computing device and/or remotely in a public or private database.

Figure 1F:
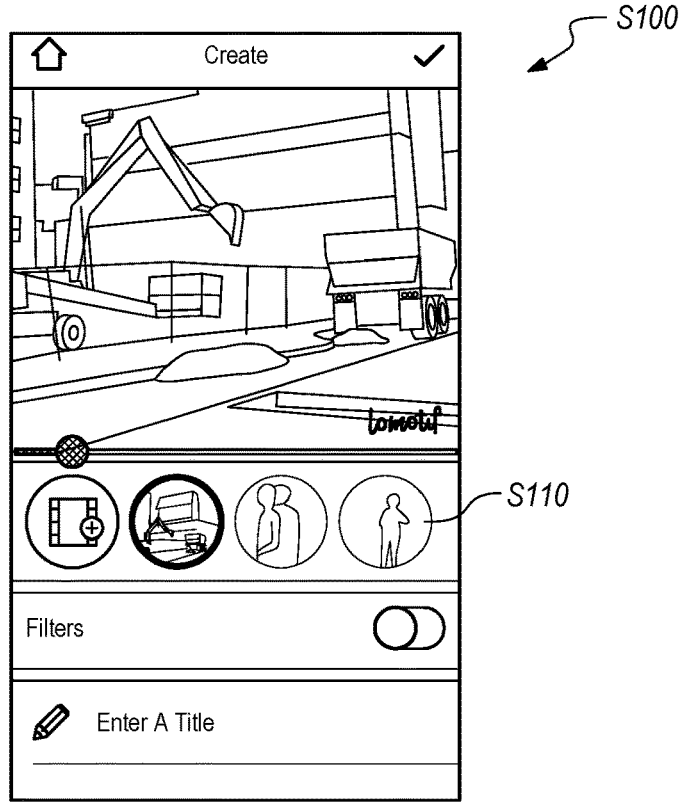

Block S110 can also include defining an initial order of videos in the initial set of videos. Generally, in Block S100, the native composition application can define an initial or default order for visual media selected for the composition, as shown in FIG. 1F. For example, the native composition application can automatically order two or more selected videos according to the order in which the videos were selected from local memory and from the public media database—accessed through an editing portal within the native composition application—by the user. In another example, the native composition application automatically arranges two or more selected videos in chronological order according to timestamps stored in video metadata (e.g., in sequential order of time at which recordation of each selected video was started or completed). In this example, the native composition application can extract a location from metadata stored with each selected video, such as in the form of a GPS or other geospatial coordinate; if all or at least a threshold proportion (e.g., 70%) of the selected videos include location metadata indicating that the selected videos were recorded at a common geographical area, such as within a threshold radius of one-quarter mile, the native composition application can automatically set an initial order of the set of videos chronologically based on a timestamp stored in metadata for each selected video. However, in this example, if the set of selected videos were recorded at disparate locations, the system can set a default order corresponding to an order in which the user selected the set of videos for the composition.

The native composition application can also present visual icons representing each selected video in order within the user interface. For example, for each selected video, the native composition application can generate a circular icon (or "bubble") containing a portion of one frame of the corresponding video and render these icons along a linear track within the user interface according to the default or initial order set for the videos. The native composition application can then reorder the icons along the linear track responsive to drag-and-drop inputs into the user interface, as in Block S130 described below.

Figure 1G:
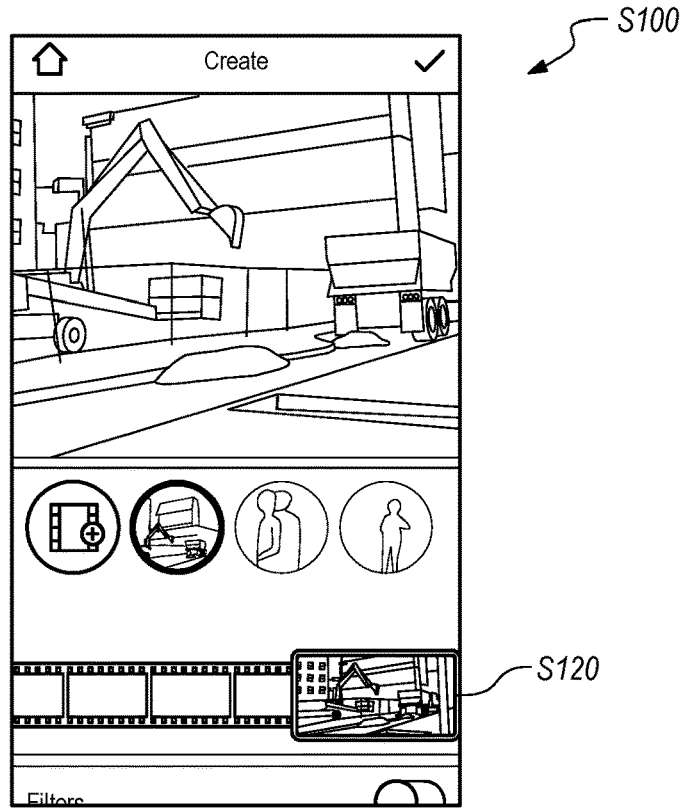
Figure 1H:
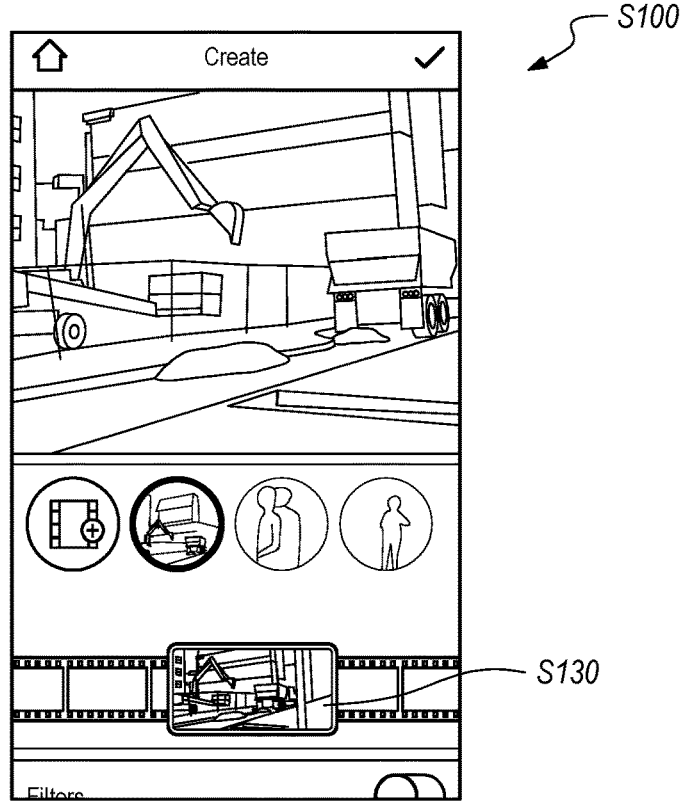
Figure 1I:
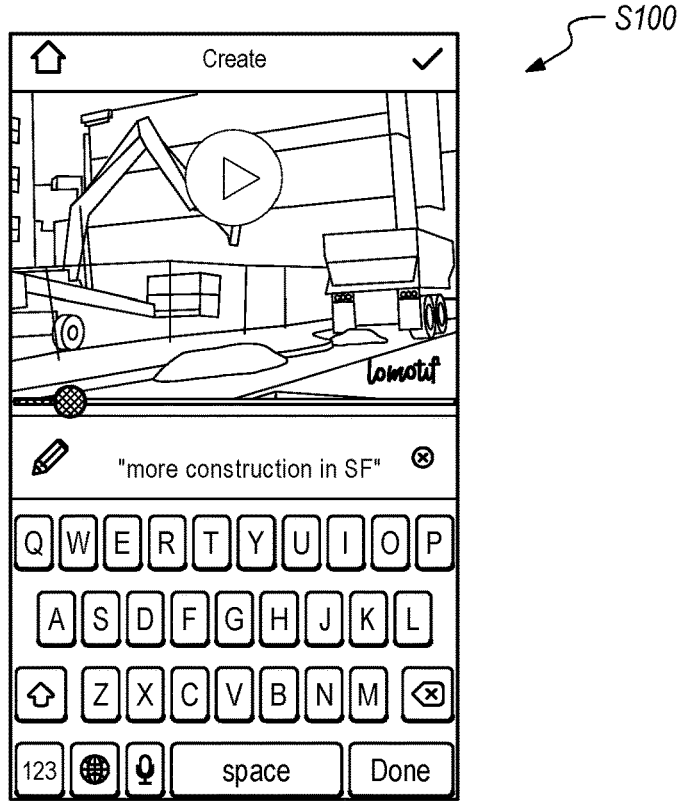
Figure 1J:
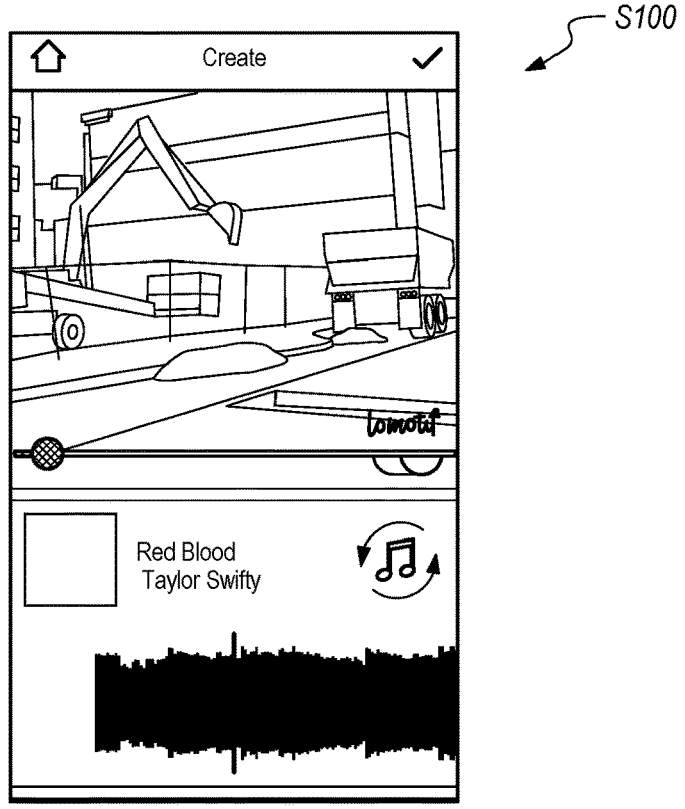
Figure 1K:
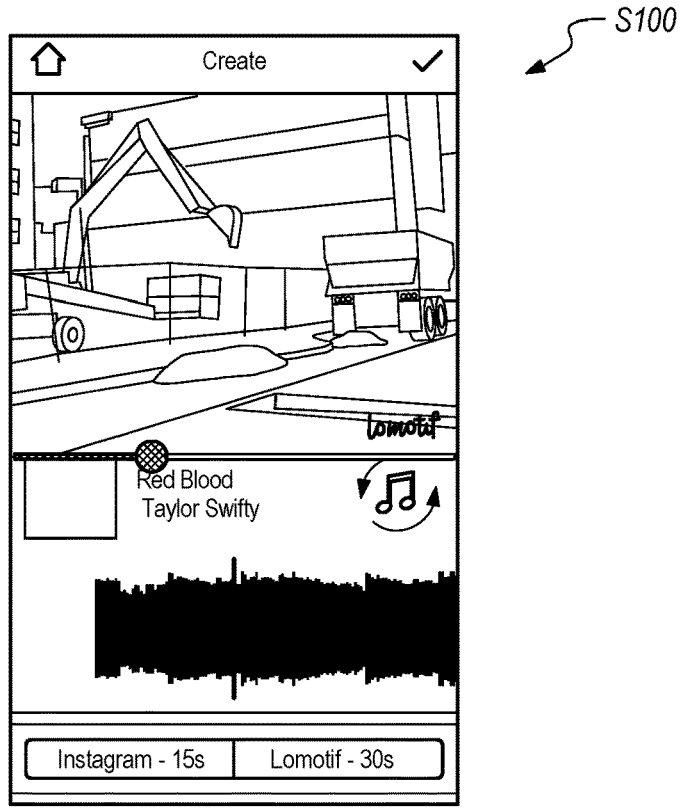
Figure 1L:
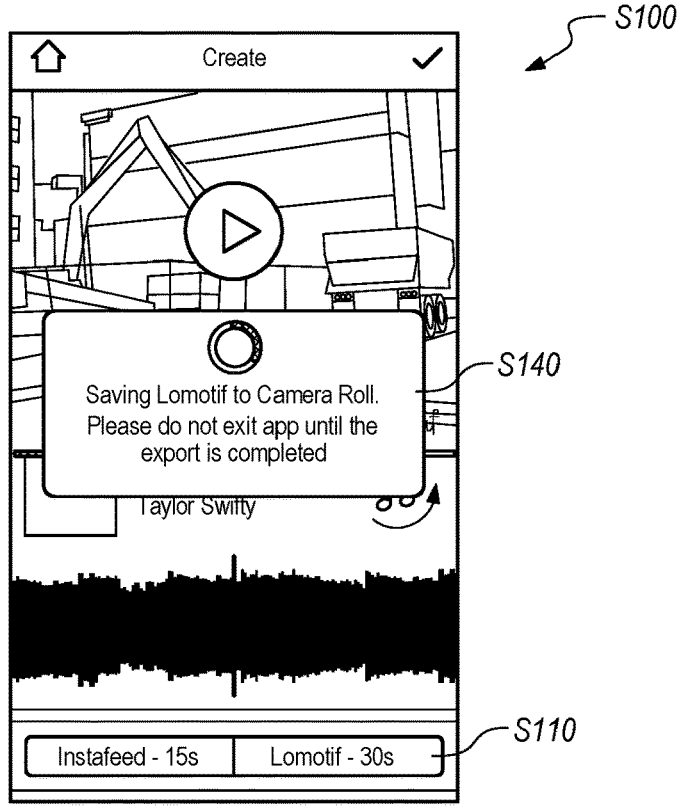

The native composition application can also set a default duration for the composition, such as 30 seconds. The native composition application can additionally or alternatively prompt the user to select a duration for the composition, such as one of six seconds, fifteen seconds, and 30 seconds, as shown in FIG. 1K. For example, the system can prompt the user to select an initial duration of the composition from a set of preset durations, wherein each preset duration corresponds to a video duration requirement unique to a particular external online social network (or to a subset of external online social networks).

However, the native composition application can execute Block S110 in any other way to collect media and to set various initial (or default) parameters for the composition.

4. Audio/Video Masks

Block S120 of the first method S100 recites setting a default position and a default duration of a video mask for each video in the set of videos based on the first audio track, the first order, and the first duration of the composition, wherein a video mask defines a contiguous subset of frames in a corresponding video for insertion into the composition. (Block S120 can similarly recite, for each video in the initial set of videos, defining an initial position and an initial duration of a video mask based on the first audio track, the initial order, and an initial duration of the composition, wherein each video mask bounds a contiguous subset of frames in a corresponding video in the initial set of videos.) Block S130 of the method recites, in response to selection of at least one of an alternative audio track, an alternative order for the set of videos, and an alternative duration of the composition, setting an alternative position and an alternative duration of the video mask for each video in the set of videos. (Block S130 can similarly recite, in response to selection of at least one of an alternative audio track, an alternative order for the initial set of videos, and an alternative duration of the composition, modifying a video mask corresponding to a video in the initial set of videos.) Generally, the native composition application executes Block S120 to automatically set initial positions and durations of video masks that, when applied to corresponding videos, define the start and stop points of each selected video, as shown in FIG. 1G. The native composition application then executes Block S130 to update or modify audio and video masks for the composition based on edits made by the user within the user interface, as shown in FIG. 1H.

In one implementation shown in FIG. 3, the native composition application analyzes the selected audio track to determine (or "characterize") a tempo (e.g., beats per minute, cadence) of the audio track and then selects a video clipping model for the selected videos based on the tempo of the audio track. In particular, the video clipping model can define a preset duration of each video segment from each selected video based on the tempo of the audio track song, the order set for the videos in the composition, and the selected duration of the composition. The native composition application can also automatically set a position of each video mask in its corresponding video, such as at the beginning of the video or centered within the duration of the video. Thus, as the composition is generated, edited, and played-back in real-time within the user interface, the native composition application can automatically apply each video mask to its corresponding video based on the preset duration defined in the video mask and the position of the video mask in the video such that only frames in a video coincident its corresponding video mask are replayed; the total duration of frames replayed across all selected videos (and introduction and/or conclusion frames) totals the selected duration of the composition. As the video segments (i.e., sequences of frames in videos bound by corresponding video masks) are replayed within the user interface, the user can shift the position of a video mask along its corresponding video to select alternative frames of the video to replay in the composition, and the native composition application can record such changes to the position of a video mask.

In one example implementation, the native composition application characterizes the selected audio track (e.g., a song) as a fast song if its number of beats per minute exceeds a threshold number of beats per minute and classifies the song as a slow song if its number of beats per minute falls below the threshold number of beats per minute, and the native composition application selects a fast video clipping model or a slow video clipping model for the composition accordingly. In another example implementation, the native composition application inserts a value for the tempo of the audio track, the number of videos selected for the composition, and/or the selected duration of the composition into a parametric video clipping model to calculate a preferred, order-specific duration of each video in the composition. However, the native composition application can implement any other model type to generate video masks for each selected video for the composition.

The native composition application can generate default video masks specifying various durations for the selected videos, such as shorter durations for videos at the beginning and end of the ordered set of videos and longer durations for videos near the middle of the ordered set of videos. In one example, the user selects a first song exhibiting a first number of beats per minute, selects a composition duration of 30 seconds, and selects five videos for a new composition. In this example, the native composition application thus: assigns a first video mask of a first duration (e.g., 5.0 seconds) to a first video in the ordered set of five selected videos; assigns a second video mask of a second duration (e.g., 6.0 seconds) to a second video, wherein the second duration is greater than the first duration; assigns a third video mask of a third duration (e.g., 8.0 seconds) to a third video segment succeeding the second video segment, wherein the third duration is greater than the second duration; assigns a fourth video mask of a fourth duration (e.g., 6.0 seconds) to a fourth video in the ordered set of five videos, the fourth duration less than the third duration; and assigns a fifth video mask of a fifth duration (e.g., 5.0 seconds) to a fifth (i.e., last) video in the ordered set of five videos, wherein the fifth duration is less than the fourth duration, in order to achieve a total duration of 30 seconds across the six video masks. Furthermore, the native composition application can generate a set of default masks that each define a substantially unique initial duration in the set of default masks but that in aggregate sum to a duration equal to the default, initial, or user-elected duration of the composition.

In the foregoing example, when the user selects an alternative song of a second speed greater than the first speed but leaves the same five videos and the same composition duration unchanged, the native composition application: reduces the first duration of the first video mask (e.g., by reducing the first duration to 4.0 seconds by clipping 0.5 second from each end of the first video mask); reduces the fifth duration of the fifth video mask (e.g., by similarly reducing the fifth duration to 4.0 seconds by clipping 0.5 second from each end of the fifth video mask); and increases the duration of the third video mask (e.g., by increasing the duration of the third video mask to 10.0 seconds by adding 1.0 second to each end of the fifth video mask), as in Block S130 described below.

Furthermore, when the user then reduces the composition duration from 30 seconds to twenty seconds, the native composition application: reduces the duration of the first video mask (e.g., by reducing the first duration to 2.0 seconds by clipping 1.0 second from each end of the first video mask); reduces the duration of the second video mask (e.g., by reducing the second duration to 3.0 seconds by clipping 1.0 second from each end of the second video mask); reduces the duration of the third video mask (e.g., by reducing the third duration to 5.0 seconds by clipping 2.5 seconds from each end of the third video mask); reduces the duration of the fourth video mask (e.g., by reducing the fourth duration to 3.0 seconds by clipping 1.0 second from each end of the fourth video mask); and reduces the duration of the fifth video mask (e.g., by reducing the fifth duration to 2.0 seconds by clipping 1.0 second from each end of the fifth video mask) to achieve a total duration of fifteen seconds across the five video masks.

In the foregoing example, when the user then adds a sixth video between the second video and the third video with the composition duration and song selection left unchanged, the native composition application: further reduces the duration of the first video mask (e.g., by reducing the first duration to 1.5 seconds by clipping 0.25 second from each end of the first video mask); reduces the duration of the second video mask (e.g., by reducing the second duration to 2.5 seconds by clipping 0.25 second from each end of the second video mask); reduces the duration of the third video mask (e.g., by reducing the third duration to 3.5 seconds by clipping 0.25 second from each end of the third video mask); reduces the duration of the fourth video mask (e.g., by reducing the fourth duration to 2.5 seconds by clipping 0.25 second from each end of the fourth video mask); reduces the duration of the fifth video mask (e.g., by reducing the fifth duration to 1.5 seconds by clipping 0.25 second from each end of the fifth video mask); and generates a sixth video mask of duration greater than the second and fourth durations (e.g., defining a duration of 3·5 seconds) to achieve a total duration of fifteen seconds across the six video masks.

Furthermore, if the total length of a particular video selected for the composition is less than the duration of its corresponding video mask, the native composition application can redistribute playback time from the particular video to video masks for other videos selected for the composition or automatically (or prompt the user to manually) shift the particular video to an alternative position associated with a video mask of a shorter duration within the composition.

The native composition application can thus automatically generate a default set of video masks for the set of selected videos for the composition in Block S120, and the native composition application can automatically adjust the durations of select video masks based on adjustments to various parameters of the composition made by the user in Block S130, such as insertion of an additional video into the set of videos, deletion of a video from the set of videos, a change in the duration of the composition, a change in the order of the set of videos in the composition, selection of an alternative audio track for the composition, etc. The native composition application can thus automatically adjust existing video masks or generate new video masks substantially in real-time based on edits made to parameters of the composition by the user.

As shown in FIG. 1K, the native composition application can similarly generate an audio mask for the selected audio track in Block S120, wherein the audio mask defines a sample from the selected audio track that is replayed over the duration of the composition. In particular, the native composition application can implement similar methods and techniques to automatically generate an audio mask that defines the start time and the end time of a sample of the audio track inserted into the composition. The native composition application can also position the audio mask within the audio track, such as at the beginning of the audio track, in the center of the audio track, aligned with a known refrain or chorus within the audio track, or aligned with a crescendo within the audio track, etc. Furthermore, as described above, the native composition application can update or modify the audio mask based on changes to the composition made by the user in Block S130. For example, the native composition application can add additional time to the end of the audio mask only (rather than to both the beginning and the end of the audio track, as for a video mask) in response to selection of a longer composition duration by the user. Similarly, if the user selects a shorter composition duration, the native composition application can automatically remove time from the end of the audio mask only (rather than from both the beginning and the end of the audio track mask, as for a video mask).

The native composition application can also generate and store video mask and audio mask sets for multiple composition durations, such as a first video/audio mask set for a six-second composition, a second video/audio mask set for a fifteen-second composition, and a third video/audio mask set for a 30-second composition. In Block S140 described below, the native composition application can similarly generate one meta file or multiple discrete meta files containing video and audio masks for multiple composition durations. For example, the native composition application can generate a first meta file that defines a first version of the composition of a first duration and a second meta file that defines a second version of the composition of a second duration greater than the first duration. In this example, the first meta file can include a specification for a first video mask—for a particular video in the composition—of a first duration; and the second meta file can include a specification for a second video mask—for the particular video—of a second duration greater than the first duration. Furthermore, in this example, the first version of the composition defined in the first meta file can be of a first preset video duration specified by a first external online social network; and the second version of the composition defined in the second meta file can be of a second preset video duration specified by a second external online social network. The native composition application can then process the composition according to versions defined in these meta files and publish processed compositions (i.e., a singular audio and video file) to corresponding external online social networks, as described below. When replaying a composition at another computing device at a later date in Block S160, the native composition application can: load the first meta file and the second meta file onto a second computing device; and selectively replay the first version of the composition and the second version of the composition according to the first meta file and the second meta file based on a selection for a version of the composition at the second computing device.

However, the native composition application can generate one or more audio or video masks in any other way in Block S120 and can modify an audio or video mask according to any other parameters in Block S130.

5. User Interface and Composition Editing

As described above, the native composition application can set an initial (or default) position of a video mask in the center of its corresponding video. During editing, the native composition application can play video segments from each video according to the order of video icons rendered along the linear track (described above), wherein each video segment of a video is defined by the position of its corresponding video mask along the duration of the video. In this implementation, as a video segment from a first video is replayed within the user interface, the native composition application can render a linear representation of the first video—such as a sequence of frames from the first video—and a representation of the first video mask positioned over the first video (and scaled to the duration of the first video) within the user interface. The user can thus drag the first video mask along the first video to select an alternative contiguous sequence of frames (i.e., an alternative "video segment") in the first video for playback in the composition, and the native composition application can update the composition (e.g., the meta file for the composition) accordingly in real-time. In particular, the native composition application can redefine a position of a particular video mask corresponding to a particular video in the set of videos in response to manual repositioning of the particular video mask within the particular video through an editing portal executing on the first computing device.

Once the native composition application completes playback of the first video segment, the native composition application can replace the first video with a linear representation of the second video and replace the first video mask with a representation of the second video mask positioned over the second video (and scaled to the duration of the second video) within the user interface. The user can then drag the second video mask along the second video to select an alternative contiguous sequence of frames in the second video for playback in the composition, as shown in FIGS. 1G and 1H, and the native composition application can again update the composition accordingly in real-time. In Block S130, the native composition application can repeat this process in order for each video selected for the composition, and the user can adjust the position of each video mask along its corresponding video to adjust the contiguous sequence of frames in these videos that are replayed in the composition.

As shown in FIG. 1K, the native composition application can similarly set an initial position of the audio mask within the selected audio track, such as aligned with the beginning of the audio track, aligned with the center of the audio track, or aligned with a position within the audio track at which the relative audio level of the audio track exceeds a threshold audio level. When the composition is replayed within the user interface, the native composition application can play back a particular segment of the audio track bounded by the audio mask. For example, as the sequence of video segments from the selected videos are replayed within the user interface, the native composition application can render a linear representation of the audio track and a representation of the audio mask positioned over the audio track (and scaled to the duration of the audio track) within the user interface. The user can thus drag the audio mask icon along the audio track icon to select an alternative section of the audio track for playback in the composition, and the native composition application can again update the composition accordingly in real-time.

6. Video Cropping

In one variation, the first method S100 includes cropping frames of video segments in the set of videos in the composition. In one implementation, the native composition application defines a static boundary for cropping frames of videos selected for the composition, such as a landscape or portrait cropping boundary based on a video output type selected by the user from within the user interface. In one example in which the user selects a landscape format for the composition, the native composition application can select whole frames in video segments of landscape videos and can crop the center of frames in video segments of square or portrait videos to create landscape frames, wherein the center of a landscape cropping boundary applied to square and/or portrait frames is static, such as aligned with the vertical center of square and/or portrait frames. Alternatively, the native composition application can prompt the user to track a preferred center of the landscape cropping boundary across each square or portrait frame in the composition as the composition is replayed, and the native composition application can map a touch point on the display of the computing device at a time that each frame in the composition is replayed to a preferred vertical position of a landscape cropping boundary for each frame. The native composition application can apply the landscape cropping boundary to square and/or portrait frames in the composition based on the preferred vertical location of the landscape cropping boundary for each frame to output a composition containing exclusively landscape frames.

In a similar example in which the user selects a square format for the composition, the native composition application can select whole frames in video segments of square videos and can crop the center of frames in video segments of landscape or portrait videos to create square frames, wherein the center of a square cropping boundary applied to a landscape and/or portrait frame is static, such as aligned with the vertical center of a portrait frame and aligned with the horizontal center of a landscape frame. Alternatively, the native composition application can prompt the user to track a preferred center of the square cropping boundary across each landscape and portrait frame in the composition as the composition is replayed within the user interface, and the native composition application can map a touch point on the display of the computing device at a time that each frame in the composition is replayed to a preferred position of a square cropping boundary for each frame. The native composition application can apply the square cropping boundary to landscape and/or portrait frames in the composition based on the preferred location of the square cropping boundary for each frame to output a composition containing exclusively square frames.

The native composition application can also capture and store positions of cropping boundaries for multiple composition formats, such as positions for both a square cropping boundary and a landscape cropping boundary across all relevant frames in the composition. For example, the native composition application can store (static or dynamic) both square and landscape cropping boundary parameters for all frames in the composition to enable the native composition application executing on the user's computing device to automatically switch from replaying the composition in full-screen square format to replaying the composition in full-screen landscape format when the computer system is transitioned from a portrait orientation to a landscape orientation during playback of the composition. In this example, the square and landscape cropping boundary parameters for all frames in the composition can be stored in a meta file, as described below, such that a second computing device (executing a second instance of the native composition application) can similarly playback both square and landscape formats of the composition and switch between these formats in real-time, such as based on the orientation of the second computing device.

The native composition application can repeat any portion or all of the above in response to selection of an alternative audio track, selection of an alternative order of visual content, an alternative duration of the composition, adjust to the duration and/or position of a video mask, or any other modification to parameters of the composition.

7. Meta File

Block S140 of the first method S100 recites generating a meta file including an address of (or a pointer to) a final audio track selected for the composition, an address of each video in a final set of videos selected for the composition, a final position and a final duration of a video mask corresponding to each video in the final set of videos, a final order for videos in the final set of videos, and a final duration selected for the composition; and Block S150 of the first method S100 recites uploading the meta file and the first video (or the private video) to a remote database. Generally, in Block S140, the native composition application generates a meta file (e.g., a binary file) specifying parameters for accessing, clipping, cropping, ordering, and combining various audio and video resources into the composition compiled and edited by the user. Furthermore, in Block S150, the native composition application functions to distribute the meta file and local content for the composition to a remote database from which the same user or other user may access the meta file and linked content for later playback at the same or other computing device. In particular, the native composition application can execute Blocks S140 and S150 to avoid generation of a master audio/video composition file when the composition is complete and to instead generate a binary (or similar) file that can be merged with audio and visual content to recreate the composition at the same or other computing device. When the composition is edited by the same user or other user at a later time, the corresponding instance of the native composition application can generate a new meta file for the altered composition in Block S140 but upload only the new meta file and any added local media to the remote database—rather than all media for the new composition—in Block S150, thereby limiting data storage requirements for compositions that are edited by one user or shared and edited by multiple users over time.

In Block S140, the native composition application can generate a meta file that specifies addresses for (or pointers to) local and/or remote audio and visual content selected for the composition and that defines how distinct media files are combined to reproduce the composition. For example, the meta file can specify parameters for visual content in the composition, such as: an Internet address for each selected video or digital photograph; the duration of each video segment; the center, start point, and/or end point of each video segment; transitions between consecutive video segments (e.g., fades); the order of the visual content; cropping parameters (e.g., size, shape, and position of both landscape and square cropping boundaries for each frame in each video segment); text overlays (e.g., position, orientation, typeface, text string, as shown in FIGS. 1I and 1J); color filters; etc. In this example, the meta file can also specify parameters for audible content in the composition, such as: an Internet address for the full or partial audio track; the duration of the audio segment; and/or a center, start point, and/or end point of the audio segment.

In Block S140, the native composition application can also define parameters for multiple video formats and composition durations. For example, the native composition application can generate a meta file that defines positions of both square and landscape cropping boundaries for each frame in each video segment in the composition. The native composition application can generate the meta file that additionally or alternatively defines composition parameters for six-second, fifteen-second, and 30-second composition durations (or "variations" of the composition). In this example, if the composition specifies visual content stored locally on the computing device, the native composition application can upload video segments for each video of duration no less than the duration of each corresponding video mask for the 30-second composition, and the meta file can store positions and durations of video masks for each composition duration for each video segment in the composition. Similarly, in this example, if the composition specifies an audio track stored locally on the computing device, the native composition application can upload an audio segment of duration sufficient to complete the 30-second composition (e.g., an audio segment 30 seconds or 34 seconds in duration), and the meta file can store positions and durations of audio masks for each composition duration.

The native composition application can thus generate a meta file locally at the computing device in Block S140 and then upload the meta file to the remote database in Block S150. In Block S150, the native composition application can also upload local audio and local visual content (e.g., videos, photographs, audio tracks) selected for the composition to the database, such as local audio and local video content not currently stored in the remote database. In one implementation, the native composition application uploads only segments of local audio and video files contained in the composition (plus a buffer) to the remote database (e.g., rather than uploading whole songs or videos to the remote database). For example, for a ten-second video clip—from a two-minute video stored locally on the computing device—the native composition application can upload only the ten-second video clip to the remote database upon completion (or submission) of the composition. Similarly, for a 30-second audio clip—from a three-minute song stored locally on the computing device—the native composition application can upload only the 30-second audio clip to the remote database.

In another implementation, the native composition application uploads a selected media clip and a buffer (or "handle") on one or both ends of the media clip (a "media segment") for each media clip in the composition that is stored locally on the computing device (but not in the remote database). For example, for a ten-second video clip—contained within the composition and originating from a two-minute video stored locally on the computing device—the native composition application can upload a fourteen-second video segment from the video to the remote database in Block S150, including two seconds of the video preceding the ten-second video clip and two seconds of the video succeeding the ten-second video clip. In another example, for a 30-second audio clip—contained within the composition and originating from a three-minute song stored locally on the computing device—the native composition application can upload a 36-second segment of the song to the remote database in Block S150, including three seconds of the song preceding the 30-second audio clip and three seconds of the song succeeding the 30-second audio clip. In this implementation, the native composition application can thus upload a set of frames of a private video—stored on the computing device and selected for the composition—to the remote database, wherein the set of frames includes: a first sequence of frames bounded by a final position and a final duration of a private video mask corresponding to the private video; a second sequence of frames preceding the first sequence of frames and spanning a preset handle duration (e.g., three seconds, ten seconds); and a third sequence of frames succeeding the first sequence of frames and spanning the preset handle duration. The remote computer system can later serve the set of frames of the private video to a second computing device selected by a user at the first computing device. An instance of the native composition application executing on the second computing device can then: generate an updated private video mask defining an updated position of the private video mask within the private video in response to manual repositioning of the private video mask within the set of frames of the private video by a second user; generate a second meta file for a second composition defining a modified arrangement of the composition, wherein the second meta file includes specifications of the updated private video mask; and then upload the second meta file to the remote database for storage and later playback of the second composition at another computing device.

In the foregoing implementation, the native composition application can implement a static buffer duration (e.g., two seconds) on one or both sides of a selected media clip to select a relevant media segment from local audio or video media stored on the computing device. Alternatively, the native composition application can select a preceding buffer and/or a succeeding buffer for a media clip based on a percentage of the length of the media clip (e.g., 10% of the length of the media clip) or based on the maximum duration of a like media clip in the composition. For example, for a 30-second composition with two three-second video clips, two five-second video clips, one six-second video clip, and one eight-second video clip, the native composition application can upload an eight-second video segment for each of the six video clips, wherein the eight-second segment of each video is centered on the video clip originally selected for the composition. In this example, the native composition application can also upload a ten-second video segment for each of the six video clips, including a one-second buffer on each end of the eight-second segments.

The native composition application can thus select particular, limited segments of audio or video media to upload—with the meta file for the composition—to the remote database in order to reduce upload time and/or reduce data storage requirements while still enabling the same user or another user to edit the composition at a later time, such as by reordering videos and by adjusting the start and stop times of media within corresponding buffers. Alternatively, the native composition application can upload whole audio files and whole video files to the remote database.

The native composition application can also prompt the user to set access permissions for audio and/or video content uploaded from the computing device. For example, the native composition application can prompt the user to define media content stored locally on the user's computing device and uploaded to the remote database as: public (e.g., accessible by any other user accessing the remote database through an instance of the native composition application); private (e.g., accessible only by the user); or limited (e.g., accessible only by individuals or devices receiving the composition directly from the user). The remote database (or remote computer system) can store these permissions and distribute media originating from the user accordingly when executing the second method S200. Other users can thus access audio and video media stored on the remote database and insert these media into their own compositions through corresponding instances of the native composition application.

8. Post-Processing

As shown in FIG. 3, one variation of the first method S100 includes: Block S180, which recites compiling the set of frames and the audio track into the composition based on the set of video masks, the audio mask, and a final order of videos in the set of videos; and Block S190, which recites posting the composition to an external online social network. Generally, in Block S180, the native composition application can locally post-process and/or transcode audio and video content selected for a composition according to a corresponding meta file into a singular audio-video file. (Alternatively, the remote computer system can post-process disparate audio and video files defining the composition into a singular audio-video file, such as upon receipt of a meta file and related content from a computing device executing an instance of the native composition application.) In particular, the native composition application (or the remote computer system) can implement audio and video post-processing techniques and/or transcoding methods in Block S180 to transform disparate audio, video, and metadata files into a singular audio-video file that can be posted to (e.g., published on) an external online social network for viewing by other users on the external online social network. The native composition application (or the remote computer system) can then automatically upload the singular audio-video file to an external online social network in Block S190 in response to selection of the external online social network and confirmation to post the composition to the selected external online social network by the user. For example, the native composition application (or the remote computer system) can post-process the composition according to a version of the composition defined in a meta file and corresponding to a video duration limit or specification for the selected external online social network.

The native composition application (and/or the remote computer system) can therefore both: generate an (uneditable) singular audio-video file that can be published to an external online social network in Block S180; and generate a meta file for the composition in Block S140, wherein the meta file can be modified by one or more other users to collaboratively edit the composition or to create additional custom compositions.

9. Sharing

A remote computer system can execute the second method S200—in conjunction with instances of a native composition application executing the first method S100 across two or more computing devices—to share a composition across multiple computing devices and to enable users to view and edit the composition at respective computing devices.

In one implementation, a first instance of the native composition application executes the first method S100 to create a first composition based on media selections and other parameters input by a first user and to upload a corresponding first meta file and local media content to the remote database, as described above. The remote database can thus store the meta file and corresponding media in Blocks S210, S220, and S230. At the first computing device, the first user can subsequently select the composition for transmission to a second user, such as by inserting a pointer or link to the composition into an email or into a text message directed to the second user. Upon receipt of the email or text message from the first user at a second computing device, the second user can select the pointer or link to open the composition in a second instance of the native composition application executing on the second computing device; the remote computer system can thus serve the first meta file and related media from the remote database to the second computing device—in Blocks S240 and S250—for local assembly into the first composition at the second computing device. The second user can thus replay the first composition locally at the second computing device through a second instance of the native composition application described above.

Furthermore, the second instance of the native composition application can implement Blocks of the first method S100 to enable the second user to reorder video clips, adjust the positions of video masks within each video clip, adjust the position of the audio mask within the audio track, and/or select alternative audio and/or video content for the first composition. The second instance of the native composition application can generate a meta file for a new (i.e., second) composition based on such changes to the first composition and can then upload both the second meta file and any new media in the second composition (and stored locally on the second computing device but not in the remote database) to the remote database. For example, the second instance of the native composition application executing on the second computing device can download a first meta file, a final set of videos, and a final audio track for a first composition from the remote database for replay at the second computing device in Blocks S240 and S250 (or Block S160). In this example, the remote database can restrict access to the first composition by users other than the first user at which the composition originated and to one or more other users specifically permitted by the first user to view the first composition. In particular, the remote database can serve the first meta file and corresponding audio and video content to the second computing device in response to receipt of a request, from the first computing device, to share the first composition with a second user associated with the second computing device. Then, in response to selection of at least one of an alternative audio track, an alternative order for the first set of videos, and an alternative video for the first composition at the second computing device, etc., the second instance of the native composition application executing on the second computing device can generate a second meta file for a second composition defining a modified arrangement of the composition. Furthermore, in response to removal of all private videos from the first composition at the second computing device to create the second composition, the remote database can enable access to the second composition by users other than the first user and the second user because all content contained in the second composition was previously made public. The second instance of the native composition application can additionally or alternatively generate a second meta file in response to insertion of a second private video, stored locally on the second computing device, into the first composition, and the remote database can store the second meta file and a portion of the second private video in the remote database and restrict access to the second composition due to existence of private video content in the second composition, as described above.

In Blocks S250 and S260, the remote computer system can collect and store the second meta file and related media in the remote database for subsequent retrieval when the second composition is called at the second user's computing device or at any other computing device for replay. For example, the second user can send (a pointer or link to) the second composition to the first user, and the first user can make modifications to the second composition through the first instance of the native composition application, as described above, before sending a third composition (based on the second composition, which is based on the first composition) to the second user. The first and second users can thus collaborate on discrete, remote computing devices to generate, review, and edit a composition over time, and the remote database can store a single copy of each media segment called across multiple compositions and one meta (e.g., binary) file for each composition rather than storing a master composition for each composition, thereby limiting data volume across a number of related and unrelated compositions.

10. Branded Content

In one variation, the remote computer system executing the second method S200 and the native composition application executing the first method S100 cooperate to serve branded media from a third-party provider to the user for selection and insertion into the composition. In one implementation, the native composition application accesses branded visual content—provided by external third-party brands—stored on the remote database and can enable the user to insert these media into the composition. For example, the remote computer system can serve a logo for a sports team or a full video advertisement for a product sold or distributed by a third-party to the native composition application, and the user can insert a free or paid form of the branded content into the composition, as described above.

In this variation, when a first branded content is selected for the composition, the native composition application can limit other media—supplied by a third-party provider—that may be combined with the first branded content to create the composition. For example, for branded visual content selected for the composition and associated with a contract for one or more particular audio tracks, the native composition application (or the remote computer system) can limit audible media available for insertion into the composition to the one or more particular audio tracks contracted within the branded visual content. The native composition application can thus limit audible content that is available for the composition based on the branded visual content selected for the composition. In another example, once the user selects a first branded content for the composition, the native composition application (or the remote computer system) can prevent insertion of branded visual content from any other third-party provider or for a competing product or service. The native composition application can thus limit other visual content available for the composition based on branded visual content already selected for the composition.

However, the native composition application (and/or the remote computer system) can support insertion of branded visual and/or audible media into the composition in any other suitable way.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for distributing a composition of audio and visual media comprising:
    receiving a selection of:
        an audio track; and
        a set of videos comprising a private video stored locally on a first computing device;
    for each video in the set of videos, defining a video mask comprising a start point in the video and a duration;
    generating a meta file comprising a pointer to the audio track, a pointer to each video in the set of videos, a set of video masks corresponding to the set of videos, and an order of the set of videos;
    uploading a portion of the private video from the first computing device to a remote database, the portion of the private video:
        characterized by a stored duration less than a private duration of the private video;
        comprising a first sequence of frames of the private video defined by a video mask corresponding to the private video;
        comprising a second sequence of frames of the private video immediately preceding the first sequence of frames and spanning a first buffer duration; and
        comprising a third sequence of frames of the private video immediately succeeding the first sequence of frames and spanning a second buffer duration; and
    loading videos in the set of videos and the audio track from the remote database onto a second computing device for replay at the second computing device according to the meta file.

2. The method of claim 1, wherein defining the video mask comprising the start point in the private video and the duration comprises:
    characterizing a tempo of the audio track; and
    selecting a particular video clipping model from a set of video clipping models based on the tempo of the audio track, the particular video clipping model defining a video mask for each video in the set of videos.

3. The method of claim 1:
    further comprising receiving a selection of a length of the composition from a set of preset durations, each preset duration in the set of preset durations corresponding to a video duration requirement of a particular external online social network; and
    wherein defining the video mask for each video in the set of videos comprises defining the set of video masks characterized by an aggregate duration equal to the length of the composition.

4. The method of claim 1, further comprising, in response to a set of locations stored with each video in the set of videos corresponding to a common geographical area, automatically defining the order of videos in the set of videos chronologically based on a timestamp stored with each video in the set of videos.

5. The method of claim 1, further comprising:
    generating a processed video comprising segments of each video in the set of videos defined by video masks corresponding to each video and a segment of the audio file based on a start point of an audio mask; and
    publishing the processed video to an external social network.

6. A method for distributing a composition of audio and visual media comprising:
    based on inputs at a first computing device, defining a first composition comprising a first audio track and a first set of video segments selected for replay with the first audio track, the first set of video segments comprising a private video segment of a private video stored on the first computing device;
    uploading, to a remote database:
        the private video segment; and
        a first sequence of frames from the private video immediately preceding the private video segment and spanning a first buffer duration; and
        a second sequence of frames immediately succeeding the private video segment and spanning a second buffer duration;
    based on inputs at a second computing device with access to the private video segment at the remote database, defining a second composition comprising a second audio track and a second set of video segments selected for replay with the second audio track, the second set of video segments comprising a modified private video segment comprising a subset of the set of buffer frames of the private video; and
    storing the second composition in the remote database for subsequent local replay of the second composition at a computing device.

7. The method of claim 6, wherein:
    defining the first composition further comprises generating a first meta file comprising:
        a pointer to the first audio track;
        for each video segment in the first set of video segments:
            a pointer to a video corresponding to the video segment;
            a video mask defining a start point of the video segment in the video corresponding to the video segment and a duration of each video segment; and
        a first order of the first set of video segments; and
    defining the second composition further comprises generating a second meta file comprising:
        a pointer to the second audio track;
        for each video segment in the second set of video segments:
            a pointer to a video corresponding to the video segment;
            a video mask defining a start point of the video segment in the video corresponding to the video segment and a duration of each video segment; and
        a second order of the second set of video segments.

8. The method of claim 6, further comprising:
    receiving the inputs at the first computing device comprising selections of:
        the first audio track; and
        a first set of videos comprising the private video, each video in the first set of videos comprising a video segment in the first set of video segments; and
    receiving the inputs at the second computing device comprising selections of:
        the second audio track; and
        a second set of videos comprising the private video, each video in the second set of videos comprising a video segment in the second set of video segments.

9. The method of claim 8:
wherein receiving the inputs at the first computing device further comprises receiving a setting of limited access privileges for the private video segment, the limited access privileges authorizing a user of the second computing device;
further comprising uploading the setting of limited access privileges for the private video segment in association with the private video segment; and
in response to receiving the inputs at the second computing device:
checking access privileges for the private video segment; and
providing an option to select the private video segment for the second composition at the second computing device.

10. A method for distributing a composition of audio and visual media comprising:
receiving a selection of:
a first audio track; and
a first set of video segments comprising a first private video segment of a private video stored locally on a first computing device;
uploading, to a remote database:
the first private video segment; and
a buffer for the first private video segment comprising:
a first sequence of frames of the private video immediately preceding the first private video segment and spanning a first buffer duration; and
a second sequence of frames of the private video immediate succeeding the first private video segment and spanning a second buffer duration;
defining a first composition comprising the first audio track and the first set of video segments arranged for replay with the first audio track;
in response to receiving a selection of a second audio track:
generating a second private video segment comprising a subset of the buffer for the first private video segment and a portion of the first private video segment;
replacing the first private video segment in the first set of video segments with the second private video segment to create a second set of video segments; and
defining a second composition comprising the second audio track and the second set of video segments arranged for replay with the second audio track; and
loading the second composition from the remote database onto a second computing device for replay at the second computing device.

11. The method of claim 10:
wherein defining the first composition further comprises generating a first meta file comprising:
a pointer to the first audio track;
for each video segment in the first set of video segments:
a pointer to a video corresponding to the video segment;
a video mask defining a start point of the video segment in the video corresponding to the video segment and a duration of each video segment; and
a first order of the first set of video segments; and
wherein defining the second composition further comprises generating a second meta file comprising:
a pointer to the second audio track;
for each video segment in the second set of video segments:
a pointer to a video corresponding to the video segment;
a video mask defining a start point of the video segment in the video corresponding to the video segment and a duration of each video segment; and
a second order of the second set of video segments.

12. The method of claim 11:
further comprising receiving, from a first user associated with the first computing device, a selection of a recipient associated with the second computing device; and
wherein loading the second composition from the remote database onto the second computing device for replay at the second computing device further comprises:
in response to receiving the selection of the recipient, loading the second set of video segments, the second audio track, and the second meta file of the second composition onto the second computing device; and
restricting access to the composition by users other than the first user and the recipient.

13. The method of claim 12, further comprising, in response to removal of the second private video segment from the second composition at the second computing device to create a third composition, enabling access to the third composition by users other than the first user and the second user.

14. The method of claim 11, further comprising redefining a start point of a particular video mask corresponding to a particular video segment, in the first set of video segments, in response to manual repositioning of the particular video mask within an editing portal accessed on the first computing device.

15. The method of claim 11:
further comprising serving the second private video segment to the second computing device with the second composition;
further comprising, in response to manual repositioning of a second private video mask corresponding to the second private video segment within the set of buffer frames of the private video within an editing portal accessed on the second computing device:
generating an updated private video mask defining an updated start point of the private video mask within the private video;
generating an updated meta file for a third composition defining a modified arrangement of the composition, the updated meta file comprising the updated private video mask; and
storing the updated meta file in the remote database for subsequent local replay of the second composition.

16. The method of claim 11:
wherein generating the first meta file further comprises generating the first meta file comprising a first preset video length specified by a first external online social network selected at the first computing device; and
wherein generating the first meta file further comprises generating a third meta file concurrently with the first meta file, the third meta file comprising a second preset video length specified by a second external online social network selected at the first computing device.

17. The method of claim 10, wherein:
defining the first composition further comprises defining the first composition comprising a first order of the first set of video segments; and defining the second composition in response to receiving the selection of the second audio track further comprises, in response to receiving the selection of the second audio track, defining the second composition comprising a second order to the second set of video segments different from the first order.

18. The method of claim 10:
further comprising receiving a first selection of a first audio segment of the first audio track;
further comprising uploading the first audio track to a remote database;
wherein defining the first composition further comprises generating the first meta file comprising a first audio mask defining a first start point in the first audio track and a duration of the first audio segment;
wherein receiving the selection of the second audio track further comprises receiving a selection of a second audio segment of the first audio track;
wherein defining the second composition further comprises generating the second meta file comprising a second audio mask defining a second start point in the first audio track and a duration of the second audio segment; and
wherein loading the second composition from the remote database onto a second computing device for replay at the second computing device further comprises serving the second audio segment of the first audio track to the second computing device.

* * * * *